United States Patent Office 3,081,315
Patented Mar. 12, 1963

3,081,315
17-(CARBOXYMETHOXY/2-HYDROXYETHOXY)-3-METHOXY-17-METHYLESTRA-1,3,5 (10)-TRIENE
Roy H. Bible, Jr., Morton Grove, Ill., assignor to G. D. Searle & Co., Chicago, Ill., a corporation of Delaware
No Drawing. Filed Feb. 2, 1962, Ser. No. 170,800
2 Claims. (Cl. 260—397.1)

This invention relates to 17-(carboxymethoxy/hydroxyethoxy)-3-oxy-17-methylestra-1,3,5(10)-triene and processes for the preparation thereof. More particularly, this invention relates to chemical compounds of the formula

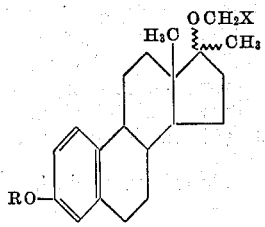

wherein R represents an alkyl or benzyl radical or hydrogen and X represents a hydroxymethylene or carboxy radical.

Among the alkyl radicals represented by R, especially lower alkyl radicals are preferred, which is to say methyl, ethyl, propyl, isopropyl, butyl, isobutyl, sec-butyl, tert-butyl, pentyl, neopentyl, hexyl, isohexyl, heptyl, and like saturated, acyclic, straight- or branched-chain, hydrocarbon groupings of empirical formula $$-C_nH_{2n+1}$$

wherein $n$ represents a positive integer less than 8.

The compounnds to which this invention relates are useful because of their valuable pharmacological properties. Thus, for example, they are tranquilizing and depress the central nervous system; further, they stimulate development of the seminal vesicles.

Preparation of the 3-ethers hereof proceeds by heating a ketal of the formula

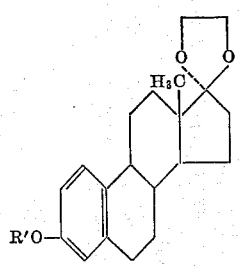

(wherein R' represents an alkyl or benzyl radical) with methylmagnesium bromide to give the corresponding 17-(2-hydroxyethoxy)-17-methyl product

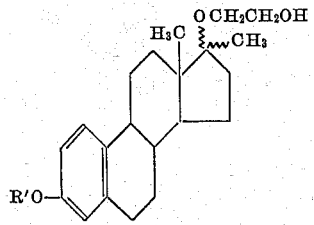

which in turn is converted to the 17-carboxymethoxy product

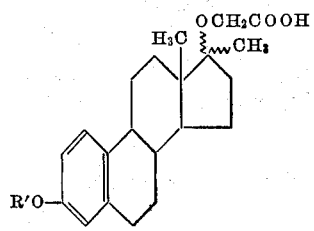

by chromic acid-sulfuric acid oxidation in acetonic medium. (R' in the latter two formulas retains the meanings previously assigned.)

The 3-phenols of this invention are derived from corresponding 3-benzyl ethers

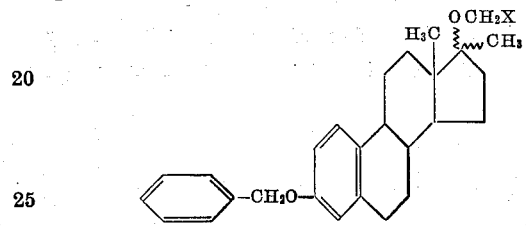

(X being defined as before) by hydrogenation in acid medium using palladium-on-charcoal catalyst.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are referred to the D line of sodium.

EXAMPLE 1

(A) *3 - methoxyestra - 1,3,5(10) - trien - 17 - one ethyleneketal.*—A mixture of 100 parts of 3-methoxyestra-1,3,5(10)-trien-17-one, 111 parts of ethylene glycol, approximately 3 parts of p-toluenesulfonic acid monohydrate, and 2250 parts of benzene is heated with agitation at the boiling point under reflux for 48 hours, water being removed as condensed in process. The resultant mixture is cooled to room temperature and slowly diluted thereat with 200 parts of aqueous 5% sodium bicarbonate during continued agitation. The benzene phase is separated, consecutively washed with aqueous 5% sodium bicarbonate and water, and stripped of solvent by vacuum distillation. The residue is crystallized from 95% ethanol containing approximately 2 parts per 1000 of pyridine to prevent hydrolysis of ketal. The 3-methoxyestra-1,3,5(10)-trien-17-one ethyleneketal thus obtained—transparent platelets—melts at approximately 101.5–102.5°.

(B) *17 - (2-hydroxyethoxy)-3-methoxy-17-methylestra-1,3,5(10)-triene.*—To a solution of approximately 36 parts of methylmagnesium bromide in approximately 70 parts of ether is added a solution of 25 parts of 3-methoxyestra-1,3,5(10)-trien-17-one ethyleneketal in 225 parts of benzene. The resultant mixture is heated with agitation and distilled until the vapor temperature reaches 72°, at which point distillation is discontinued and the mixture heated at the boiling point under reflux for 15½ hours. It is then cooled and poured onto ice. The mixture thus obtained is acidified with 10% hydrochloric acid, whereupon the benzene phase is separated, washed with water, and stripped of solvent by distillation. The residue is chromatographed on silica gel, using benzene and ethyl acetate in increasing amounts of the latter as developing solvent. From an eluate comprising 15% ethyl acetate in benzene, on distillation of solvent and recrystallization of the residue from hexane, there is obtained 17-(2-hydroxyethoxy)-3-methoxy-17-methylestra-1,3,5(10)-triene melting at 104–105.5° and further characterized by a specific rotation of +45° (1% in chloroform solution). The product has the formula

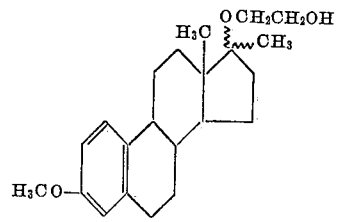

EXAMPLE 2

*17 - carboxymethoxy - 3 - methoxy-17-methylestra-1,3,5 (10)-triene.*—To a solution of 4 parts of 17-(2-hydroxyethoxy)-3-methoxy-17-methylestra-1,3,5(10)-triene in 48 parts of acetone is added a solution of 2 parts of chromic acid and 3 parts of concentrated sulfuric acid in 6 parts of water. The resultant mixture is allowed to stand for 10 minutes, whereupon it is diluted with 4 volumes of water. Insoluble solids are filtered off and recrystallized from acetone, affording 17-carboxymethoxy-3-methoxy-17-methylestra-1,3,5(10)-triene melting at 181.5–183.5° and further characterized by a specific rotation of +38° (1% in chloroform solution). The product has the formula

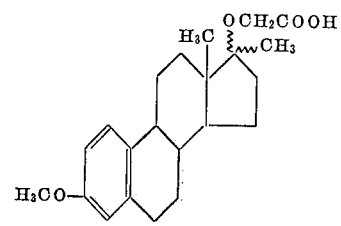

What is claimed is:
1. 17 - (2-hydroxyethoxy)-3-methoxy-17-methylestra-1, 3,5(10)-triene melting at 104–105.5° and having a specific rotation of +45° (1% in chloroform solution).
2. 17 - carboxymethoxy-3-methoxy-17-methylestra-1,3,5 (10)-triene melting at 181.5–183.5° and having a specific rotation of +38° (1% in chloroform solution).

No references cited.